United States Patent
Chiwata

(10) Patent No.: US 9,486,705 B2
(45) Date of Patent: Nov. 8, 2016

(54) EXERCISE SUPPORT DEVICE, PROGRAM, EXERCISE SUPPORT SYSTEM, AND MOTION DETECTION DEVICE

(71) Applicant: Konami Digital Entertainment, Inc., El Segundo, CA (US)

(72) Inventor: Hiroyuki Chiwata, Redondo Beach, CA (US)

(73) Assignee: KONAMI DIGITAL ENTERTAIMENT, INC., El Segundo, CA (US)

(*) Notice: Subject to any disclaimer, the term of this patent is extended or adjusted under 35 U.S.C. 154(b) by 743 days.

(21) Appl. No.: 13/779,059

(22) Filed: Feb. 27, 2013

(65) Prior Publication Data

US 2013/0288760 A1 Oct. 31, 2013

Related U.S. Application Data

(60) Provisional application No. 61/638,645, filed on Apr. 26, 2012.

(51) Int. Cl.
*A63F 9/24* (2006.01)
*A63F 13/00* (2014.01)
(Continued)

(52) U.S. Cl.
CPC .............. *A63F 13/44* (2014.09); *A63F 13/214* (2014.09); *A63F 13/537* (2014.09);
(Continued)

(58) Field of Classification Search
CPC ................ A63F 2300/8005; A63F 2300/8047; A63F 13/537; A63F 13/5375; A63F 13/814
See application file for complete search history.

(56) References Cited

U.S. PATENT DOCUMENTS 4,720,789 A * 1/1988 Hector .................... A63F 13/06
463/33
6,227,968 B1 5/2001 Suzuki et al.
(Continued)

FOREIGN PATENT DOCUMENTS

JP  H11-033230 A  2/1999
JP  3003851 B  1/2000
(Continued)

OTHER PUBLICATIONS

Japanese Office Action of corresponding Japanese Patent Application No. 2005-071185, dated on Apr. 21, 2006.
(Continued)

*Primary Examiner* — Steven J Hylinski
(74) *Attorney, Agent, or Firm* — Global IP Counselors, LLP

(57) ABSTRACT

An exercise support device including an input which inputs player motion information from a reference position, and an instructing component which displays a motion evaluation mark on a screen, a motion instruction mark in a scrolling manner on the screen, a plurality of display patterns of a series of motion instruction marks in a distinguishable manner on the screen such that the display patterns include at least first and second display patterns, with the second display pattern having the motion instruction marks of the first display pattern and additional motion instruction marks, and instructs the player on a motion timing represented by the motion instruction mark so that the motion evaluation and instructions marks coincide. The exercise support device further includes an evaluating component which evaluates a player's motion based on a level of coincidence of the motion instruction and evaluation marks that correspond to the player's motion.

4 Claims, 12 Drawing Sheets

(51) Int. Cl.
*A63F 13/44* (2014.01)
*A63F 13/54* (2014.01)
*A63F 13/5375* (2014.01)
*A63F 13/814* (2014.01)
*A63F 13/843* (2014.01)
*A63F 13/537* (2014.01)
*A63F 13/79* (2014.01)
*A63F 13/214* (2014.01)

(52) U.S. Cl.
CPC .......... *A63F 13/5375* (2014.09); *A63F 13/54* (2014.09); *A63F 13/79* (2014.09); *A63F 13/814* (2014.09); *A63F 13/843* (2014.09)

(56) References Cited

U.S. PATENT DOCUMENTS

| | | | |
|---|---|---|---|
| 6,320,110 B1* | 11/2001 | Ishikawa | G10H 1/0008 434/307 A |
| 6,379,244 B1* | 4/2002 | Sagawa | A63F 13/08 434/307 A |
| 6,659,873 B1* | 12/2003 | Kitano | A63F 13/10 434/307 A |
| 6,695,694 B2 | 2/2004 | Ishikawa et al. | |
| 7,355,585 B2 | 4/2008 | Hosomizu | |
| 7,367,887 B2 | 5/2008 | Watabe et al. | |
| 7,864,168 B2 | 1/2011 | French | |
| 8,262,483 B2* | 9/2012 | Inubushi | A63F 13/08 463/15 |
| 8,905,844 B2* | 12/2014 | Okamoto | A63F 13/06 463/36 |
| 2001/0004861 A1* | 6/2001 | Suzuki | A63F 13/08 84/609 |
| 2001/0012795 A1* | 8/2001 | Asami | G10H 1/0008 463/1 |
| 2001/0016510 A1* | 8/2001 | Ishikawa | A63F 13/10 463/7 |
| 2002/0025841 A1* | 2/2002 | Nobe | A63F 13/10 463/1 |
| 2002/0111541 A1 | 8/2002 | Bibl et al. | |
| 2005/0154821 A1 | 7/2005 | Furuhashi et al. | |
| 2006/0266200 A1* | 11/2006 | Goodwin | A63F 13/02 84/611 |
| 2006/0267963 A1* | 11/2006 | Pryor | G06F 3/011 345/173 |
| 2015/0235302 A1* | 8/2015 | Hashimoto | G06Q 30/0639 705/26.9 |

FOREIGN PATENT DOCUMENTS

| | | |
|---|---|---|
| JP | 2001-224729 A | 8/2001 |
| JP | 2001-340646 A | 12/2001 |
| JP | 2002-279117 A | 9/2002 |
| JP | 2003-010545 A | 1/2003 |
| JP | 2003-038696 A | 2/2003 |
| JP | 2005-046649 A | 2/2005 |
| JP | 2006-247258 A | 9/2006 |
| JP | 2007-125251 A | 5/2007 |

OTHER PUBLICATIONS

Japanese Office Action of corresponding Japanese Patent Application No. 2005-071185, dated on Sep. 13, 2006.
Japanese Office Action of corresponding Japanese Patent Application No. 2005-071185, dated on Feb. 20, 2007.
U.S. Office Action of corresponding U.S. Appl. No. 11/886,142, dated on Mar. 31, 2011.

* cited by examiner

| Player ID | Current usage data ||||| Usage history data ||
| --- | --- | --- | --- | --- | --- | --- | --- |
| | Usage mat ID | Affiliated team | Evaluation | Continuous usage time (h) | Energy expenditure (Kcal) | Aggregate usage time (h) | ... |
| 10000 | 32 | A | 35 | 0.8 | 800 | 35 | ... |
| 10001 | 18 | C | 47 | 1.2 | 1400 | 48 | ... |
| ⋮ | ⋮ | ⋮ | ⋮ | ⋮ | ⋮ | ⋮ | ⋮ |

FIG.7

EXERCISE SUPPORT DEVICE, PROGRAM, EXERCISE SUPPORT SYSTEM, AND MOTION DETECTION DEVICE

CROSS-REFERENCE TO RELATED APPLICATION

This application is based upon and claims the benefit of priority of the U.S. Provisional Application No. 61/638,645 filed in the U.S. Patent and Trademark Office on Apr. 26, 2012, the entire contents of which are incorporated herein by reference.

FIELD

The present invention relates to a technology for supporting exercise by a player by instructing the player on the timing of a motion.

BACKGROUND

Conventionally, a dance game device is known that is configured to provide stepping motion timing instructions to a player by a sequential scrolling display so that the player performs stepping motions (steps) in accordance with the timing instructions and the stepping motions performed by the player are evaluated (see Japanese Patent No. 3003851). Further, a system is known that is configured to display stepping motion evaluation results of a plurality of players on one display (see Japanese Patent Laid-open No. 2006-247258). Further, a system is known that provides terminal devices that can detect motions by the players to each of a plurality of players and allows for a guide image to be used in common among the players to encourage the motions of the plurality of players while being able to evaluate the motions of each player by receiving detection signals from the terminal devices for evaluating the motion states of the players (see Japanese Patent Laid-open No. 2007-125251).

However, in the conventional device or systems, although a player receives instructions for a stepping motion timing in accordance with a song, for example, the player may want to change the level of the contents of the timing instructions in the middle of the song if the contents of the stepping motion timing instructions are too difficult or too easy compared to the skill level of the stepping motions of that player. However, in the conventional device or systems, respective players are not able to adjust the degree of the stepping motions in accordance with their own stepping motion skill level when a plurality of players are performing the stepping motions while watching a shared display screen.

Consequently, an object of one aspect of an invention is to provide an exercise support device, a program, an exercise support system, and a motion detection device that allow a player to select that player's own display for instructing on the timing of motions without performing a special operation while performing the motions when a display for instructing the player on the timing of the motions is conducted and the player is performing the motions in accordance with the display.

SUMMARY

A first aspect of the present invention is an exercise support device that includes:

an input means for inputting motion information of a player from a certain reference position;

an instructing means for displaying a motion evaluation mark on a screen and displaying a motion instruction mark in a scrolling manner on the screen, and instructing the player on a motion timing represented by the motion instruction mark so that the motion evaluation mark and the motion instruction mark coincide; and an evaluating means for evaluating a player's motion on the basis of a level of coincidence of the motion instruction mark and the motion evaluation mark that correspond to a motion when a player performs the motion;

wherein, the instructing means displays a plurality of display patterns of a series of motion instruction marks in a distinguishable manner on the screen; and the plurality of display patterns includes at least a first display pattern and a second display pattern, and the second display pattern is formed so as to have the motion instruction marks of the first display pattern and include additional motion instruction marks.

According to this exercise support device, since a plurality of display patterns of a series of motion instruction marks are displayed in distinguishable manner on the screen when the player is performing the motions in accordance with the instructed motion timings, the player can select any of the display patterns voluntarily without performing a special operation during the motions, and then can perform the motions according to the selected display pattern. Further, since a second display pattern is formed so as to have the motion instruction marks of the first display pattern and include additional motion instruction marks, the change can be conducted smoothly during the motions so long as the player focuses on the addition or reduction of the motion instruction marks when the player changes the selected display pattern between the first display pattern and the second display pattern. A method of dividing the screen into a plurality of areas and assigning display patterns to each area, or a method of displaying display patterns in a common display area on the screen while varying each of the display modes of the display patterns may be adopted as a method for displaying the plurality of distinguishable display patterns on the screen.

The instructing means in the above exercise support device may preferably display a motion instruction mark common to the first display pattern and the second display pattern with an identical first display mode, and displays the additional motion instruction marks among the motion instruction marks included in the second display pattern with a second display mode that is different from the first display mode.

By using such displays, the changing of the display pattern during the motions may be conducted more smoothly to allow the moving marks that are added or removed and are closely followed in particular by the player when changing the display pattern selection between the first display pattern and the second display pattern, to be recognized more easily by the player. Further, the first display pattern and the second display pattern can be made to be distinguishable even when the first display pattern and the second display pattern are displayed in a common display area on the screen.

The evaluating means in the above exercise support device may associate, with a player, an index indicating a level of coincidence of the motion instruction mark and the motion evaluation mark for each of the motion instruction marks, and displays the index in a scrolling manner. By displaying in the sequential scrolling manner the index indicating the level of coincidence of the marks, the player can immediately visually recognize their own good and bad motion timings with respect to the motion instruction marks. As a result, the player is able to select a display pattern appropriate to their own skill level and the like from among the plurality of display patterns.

The evaluating means in the above exercise support device may preferably evaluate a player's motions on the basis of a number of motions with a high level of coincidence of the motion instruction mark and the motion evaluation mark.

Since more motion instruction marks are included in the second display pattern than in the first display pattern, the number of motions of the second display pattern becomes more than that of the first display pattern when the player follows all of the motion instruction marks. Accordingly, in order to appropriately evaluate the player's motions even when the player changes the display pattern during the motions, the player's motions are preferably evaluated by the number of motions performed at a good timing by the player.

The input means in the above exercise support device may receive the motion information of a plurality of players and may display results of evaluations of motions by the plurality of players, or may display results of evaluations of player motions in group units when the plurality of players are divided into a plurality of groups, with display modes that allow comparison between players or between groups. As a result, a competitive spirit is induced between players or between teams and the players can be encouraged to perform the motions with a higher level of concentration.

The above exercise support device may include an output means for outputting music and the display pattern is preferably generated so as to accompany the rhythm of the music outputted by the output means. As a result, the players are motivated to perform the motions at the appropriate timing accompanying the music without monotonous motions and can enjoy the motions themselves.

A second aspect of the present invention is a program that causes a computer to implement an input function for inputting motion information of a player from a certain reference position;

an instructing function for displaying a motion evaluation mark on a screen and displaying a motion instruction mark in a scrolling manner on the screen, and instructing the player on a motion timing represented by the motion instruction mark so that the motion evaluation mark and the motion instruction mark coincide; and an evaluating function for evaluating a player's motion on the basis of a level of coincidence of the motion instruction mark and the motion evaluation mark that correspond to a motion when a player performs the motion;

wherein the instructing function displays a plurality of display patterns of a series of motion instruction marks in a distinguishable manner on the screen; and the plurality of display patterns includes at least a first display pattern and a second display pattern, and the second display pattern is formed so as to have the motion instruction marks of the first display pattern and include additional motion instruction marks.

A third aspect of the present invention is an exercise support system comprising a motion detection device and an exercise support device: wherein the motion detection device comprises:

a detection means for detecting a motion of a player from a certain reference position; and an output means for outputting player motion information that is a detection result of the motions of the player to the exercise support device; wherein the exercise support device comprises:

an input means for inputting motion information of a player from a certain reference position;

an instructing means for displaying a motion evaluation mark on a screen and displaying a motion instruction mark in a scrolling manner on the screen, and instructing the player on a motion timing represented by the motion instruction mark so that the motion evaluation mark and the motion instruction mark coincide; and an evaluating means for evaluating a player's motion on the basis of a level of coincidence of the motion instruction mark and the motion evaluation mark that correspond to a motion when a player performs the motion;

wherein, the instructing means displays a plurality of display patterns of a series of motion instruction marks in a distinguishable manner on the screen; and the plurality of display patterns includes at least a first display pattern and a second display pattern, and the second display pattern is formed so as to have the motion instruction marks of the first display pattern and include additional motion instruction marks.

A fourth aspect of the present invention is a motion detection device connected to an exercise support device, the motion detection device comprising:

a detection means for detecting a motion of a player from a certain reference position; and an output means for outputting player motion information that is a detection result of the motion of the player to the exercise support device;

wherein, the exercise support device comprises:

inputting motion information of a player from a certain reference position;

displaying a motion evaluation mark on a screen and displaying a motion instruction mark in a scrolling manner on the screen, and instructing the player on a motion timing represented by the motion instruction mark so that the motion evaluation mark and the motion instruction mark coincide;

evaluating a player's motion on the basis of a level of coincidence of the motion instruction mark and the motion evaluation mark that correspond to a motion when a player performs the motion;

displaying a plurality of display patterns of a series of motion instruction marks in a distinguishable manner on the screen; and the plurality of display patterns includes at least a first display pattern and a second display pattern, and the second display pattern is formed to include the moving marks of the first display pattern and include additional moving marks.

BRIEF DESCRIPTION OF DRAWINGS

Referring now to the attached drawings which form a part of this original disclosure:

FIG. 7 is an example of data recorded in a storage;

DESCRIPTION OF EMBODIMENT(S)

(1) Exercise Support System

The following is an explanation of a first embodiment of an exercise support system of the present invention. The exercise support system is a system that inputs movement information about the stepping movements of a player as an example of motions of the player to conduct evaluations of the player's motions so that the player can continue exercising with a sense of playing a game, and thus the system may be treated as a game system.

Figure 1:
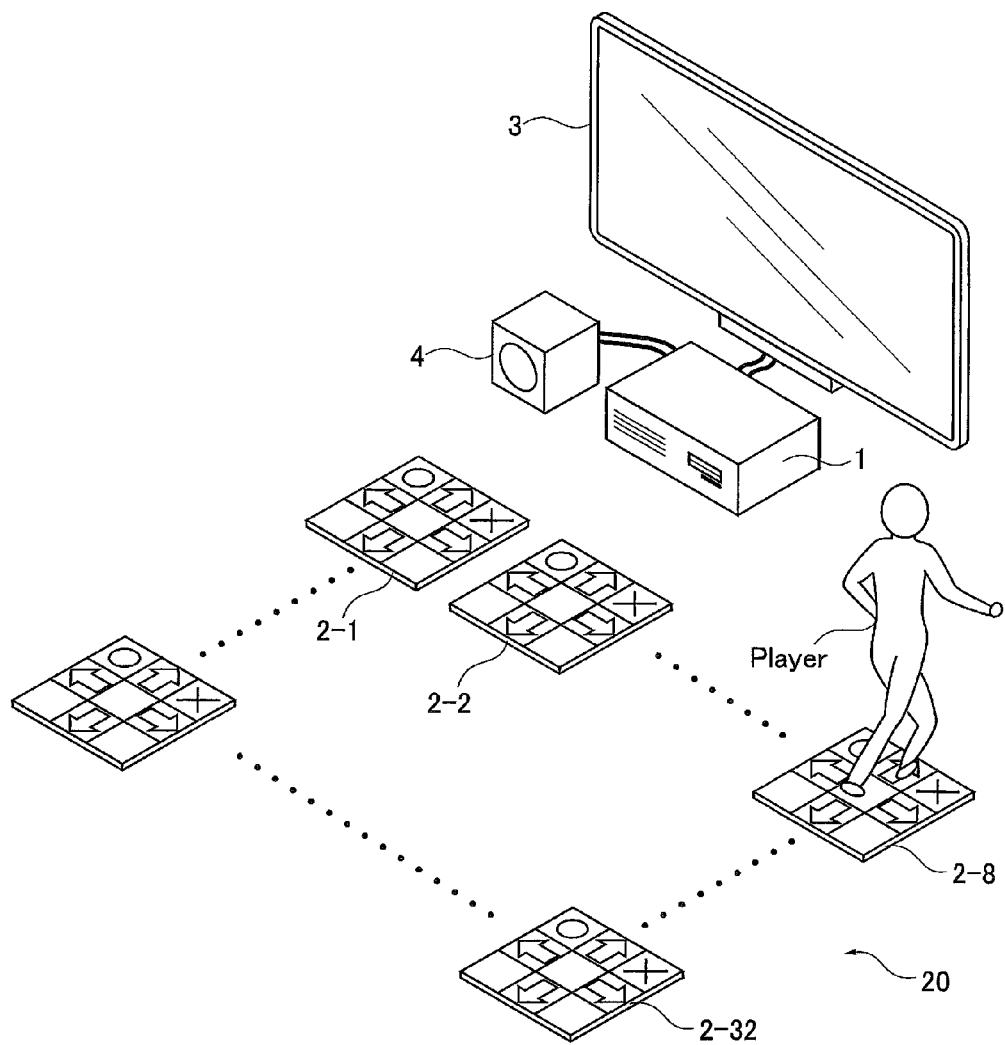
FIG. 1 is a system outline of the exercise support system of an embodiment.

FIG. 1 illustrates a system outline of the exercise support system of the embodiment. Preferred set up locations of the exercise support system of the embodiment may include, for example, a training room in an athletic facility or a sports gymnasium. As illustrated in FIG. 1, mats for the players to perform stepping motions are provided in a certain number in the exercise support system. FIG. 1 illustrates an example with 32 mats including mats 2-1 to 2-32 arranged in an eight-by-four matrix. Specifically, the example is configured to allow thirty-two players to perform the movements at the same time. Explanations of features in common among the mats will refer to a mat 2 hereinbelow.

The number of mats may be determined arbitrarily in the exercise support system. Specifically, the number of mats is not limited to the thirty-two mats (e.g., mats for thirty-two players) illustrated in FIG. 1 and can be determined arbitrarily. The arrangement of a mat group 20 of the mats 2 is not limited to a matrix and thus may be set arbitrarily so long as the players moving on the mats are able to see a display device 3. A monitor of the display device 3 is preferably a large screen in which the display contents can be clearly seen by a relatively large number of players.

Each mat of the mat group 20 represents an example of a motion detection device for detecting whether a player has performed any of the backward, forward, left, and right stepping motions. An information processor apparatus 1 displays on the display device 3 a display pattern for instructing the players on the stepping motions, and evaluates the stepping motions of the players. The information processor apparatus 1 is connected to each of the mats 2 through wireless communication and obtains detection results of the stepping motions by the players on the mats 2 through wireless communication, and consequently evaluates the stepping motions of the players. The information processing apparatus 1 and the mats 2 may be connected by wiring and may be connected for communication by wiring.

A speaker 4 is provided for outputting a song corresponding to the display pattern for instructing the players on the stepping motions. The outputting of the song helps the players perform the motions more easily in accompaniment to the rhythm of the song.

(2) Evaluation of Player Motions in Exercise Support System

Figure 2:
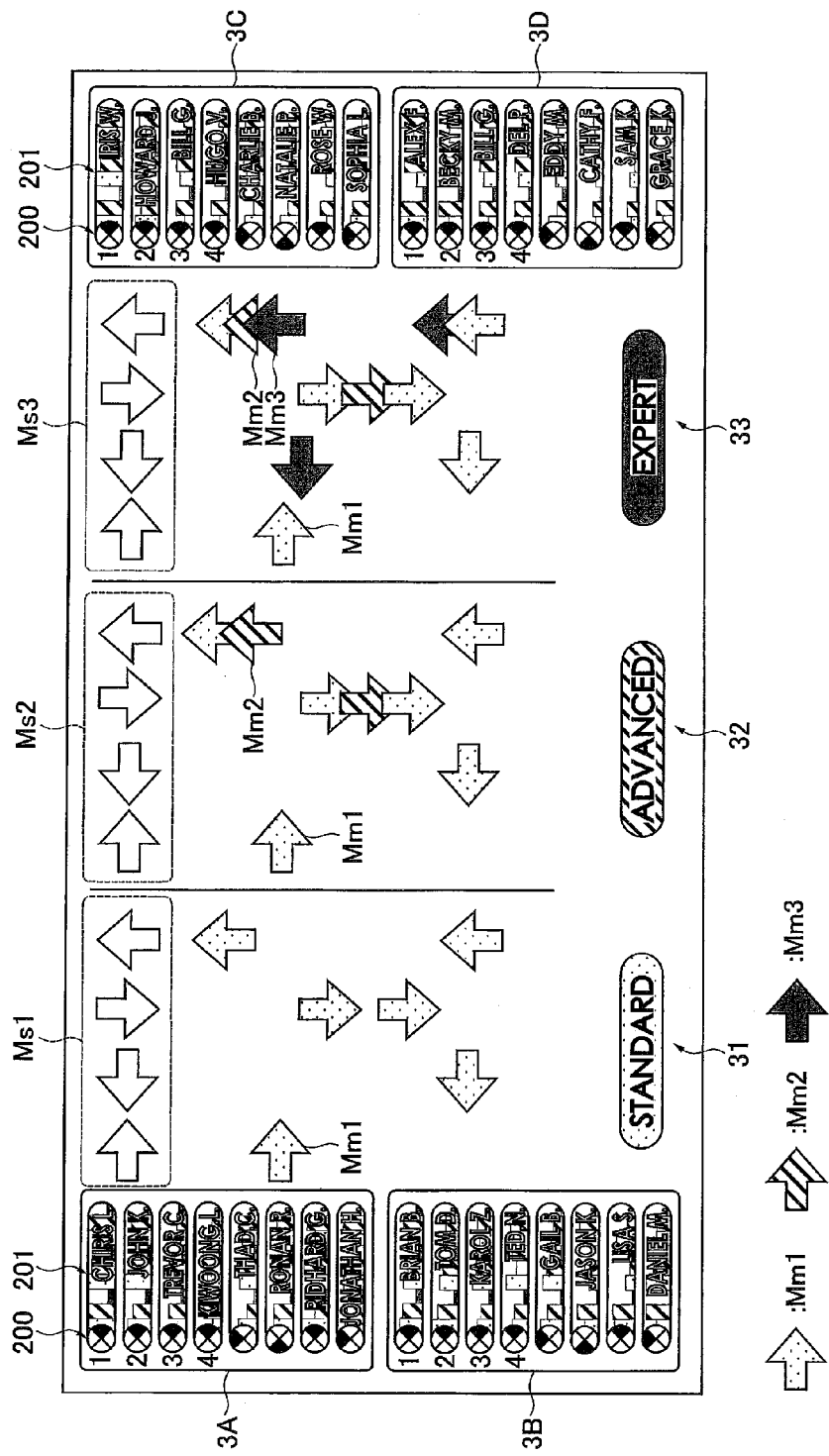
FIG. 2 is an example of a game screen displayed on a display monitor of a display device.

The evaluation of the motions of the players in the exercise support system of the present embodiment will be described with reference to FIG. 2. FIG. 2 is an example of a screen displayed on a display monitor of the display device 3. In FIG. 2, display areas 3A to 3D are areas for displaying display names for identifying the players performing the stepping motions on the respective mats of the mat group 20, and for displaying the evaluation results of the stepping motions of each player. In FIG. 2, the display areas 3A to 3D are configured so as to divide the thirty-two players into four teams (teams corresponding to each of the display areas 3A to 3D) and display the players in each team. However, the present embodiment is not limited as such. The number of teams and the number of players affiliated with the teams may be changed as desired, or the players may not be divided into teams. The example of the display screen illustrated in FIG. 2 includes a display area 31 corresponding to "STANDARD" that represents a standard level of difficulty, a display area 32 corresponding to "ADVANCED" that represents a level of difficulty higher than "STANDARD", and a display area 33 corresponding to "EXPERT" that represents a level of difficulty higher than "ADVANCED".

A "moving mark" and a "stationary mark" respectively represent examples of a motion instruction mark and a motion evaluation mark in the present invention.

A stationary mark group Ms1 including four stationary marks depicted by arrows in the four directions of up, down, left, and right is displayed at the top in the "STANDARD" display area 31. Moving marks Mm1 that are depicted by arrows in the same directions as the stationary mark display directions are configured to appear from bottom of the screen and move in a scrolling manner upwards. The present embodiment is configured as a scheme in which the stepping motions of the players are evaluated higher in correspondence with a shorter deviation time between a timing in which a moving mark for displaying a certain direction overlaps with by a stationary mark displaying the same direction in the stationary mark group Ms1, and a timing in which the player performs the stepping motion in that direction on the mat 2.

In the exercise support system of the present embodiment as illustrated in FIG. 2, the "STANDARD", "ADVANCED", and "EXPERT" levels of difficulty display patterns are displayed at the same time as a series of display patterns of the moving marks in the same song. The "ADVANCED" display pattern is formed to include the moving marks that make up the "STANDARD" display pattern and to include additional moving marks Mm2. The "EXPERT" display pattern is formed to include the moving marks that make up the "ADVANCED" display pattern and to include additional moving marks Mm3. Specifically, the display patterns are configured so that the number of moving mark increases in order from "STANDARD" to "ADVANCED" to "EXPERT". As a result, a player is expected to perform the stepping motions corresponding to the moving marks that increase in number in order from "STANDARD" to "ADVANCED" to "EXPERT", and the level of difficulty of the stepping motions becomes higher in the same order. A player is able to determine by themselves and select a level of difficulty even during a song in order to cause the display patterns corresponding to the three levels of difficulty to be displayed on the same display monitor at the same time in the exercise support system. The selection of a display pattern is performed by the player selecting a display pattern to be the basis for their own motions while watching the screen without the player making the selection by conducting a special operation.

The moving marks Mm1 that make up the "STANDARD" display pattern, the moving marks Mm2 that make up the "ADVANCED" display pattern, and the moving marks Mm3 that make up the "EXPERT" display pattern may preferably have display modes that are different from each other. As a result, the player can easily recognize the moving marks that are added or removed due to the different level of difficulty, and the player can move more easily in correspondence to the change of the level of difficulty of play during a song.

(3) Configuration of Devices that Make up the Exercise Support System (3-1) Mat

Figure 3:
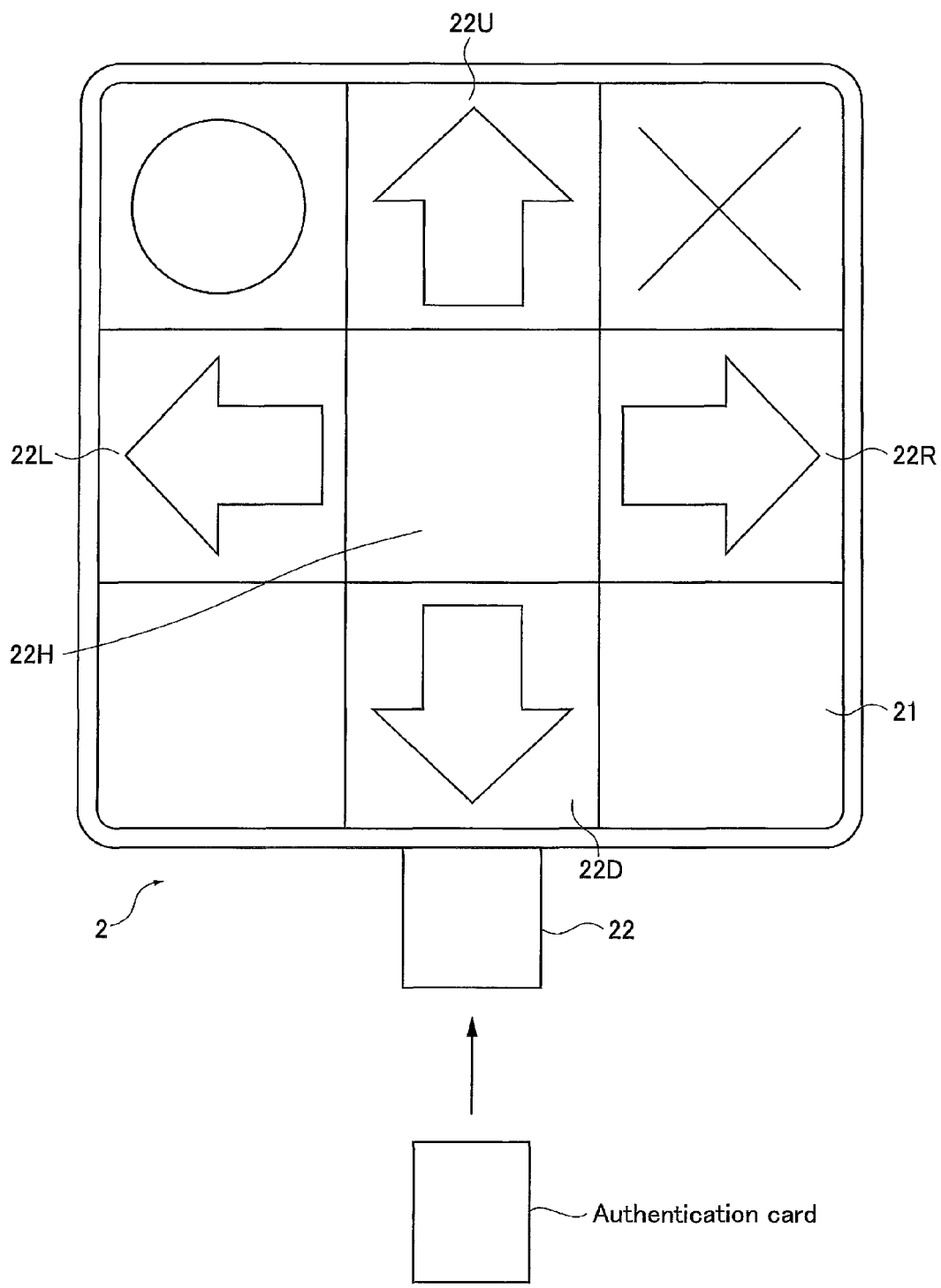
FIG. 3 is a schematic plan view of a mat of the embodiment.
Figure 4:
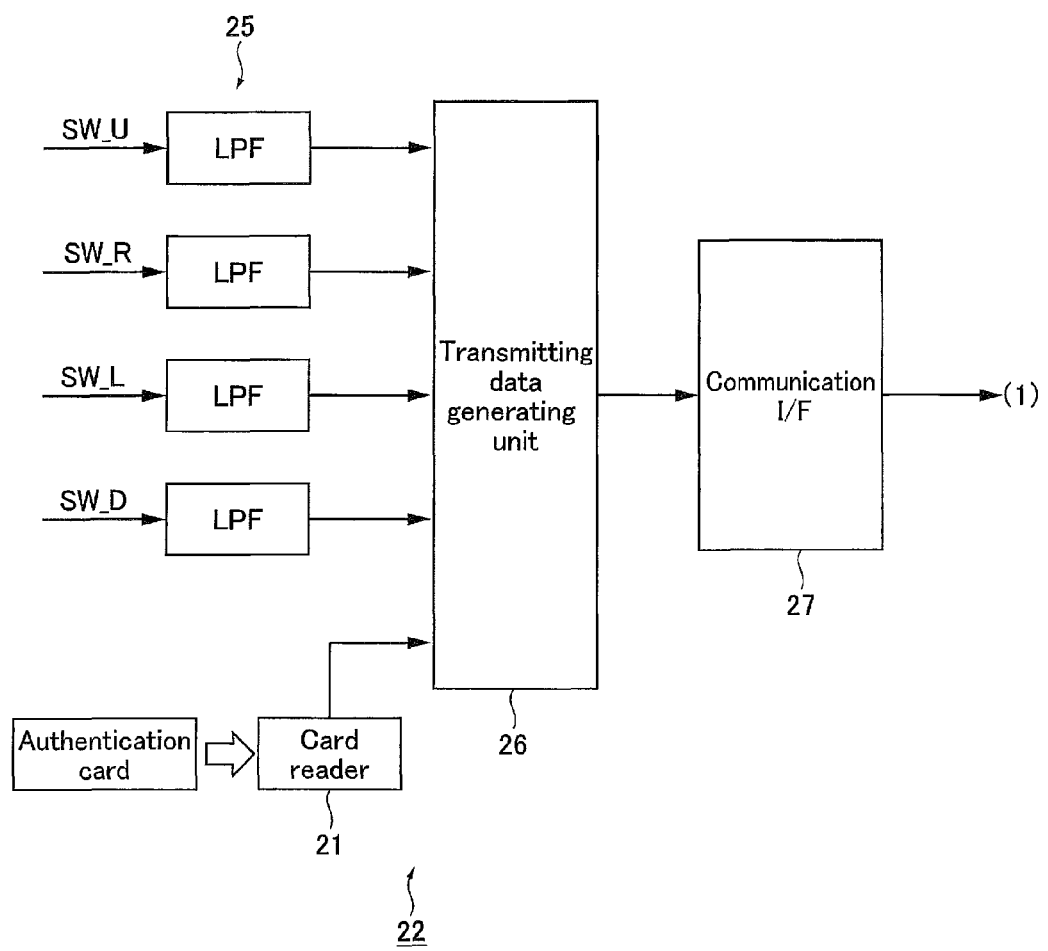
FIG. 4 is a block diagram illustrating an internal configuration of the mat of the embodiment.

Next, a description of the mat 2 that is an embodiment of the motion detection device of the present invention will be provided with reference to FIGS. 3 and 4. FIG. 3 is a schematic plan view of the mat 2 of the present embodiment. FIG. 4 is a block diagram illustrating an internal configuration of the mat 2 of the present embodiment. The mat 2 is a device for detecting a player's stepping motions.

Referring to FIG. 3, the mat 2 of the present embodiment includes a foot switch 21 and a signal processing unit 22. As illustrated in FIG. 3, the foot switch 21 includes detection areas 22U, 22R, 22L, and 22D for respectively detecting stepping motions in the forward, left, right, and backward directions. The symbols "○" and "x" depict an appropriate arrangement direction of the foot switch 21 for guiding the player or a system operator. For example, by arranging the foot switch 21 so that the "○" and "x" point toward the display monitor, proper detection results of the stepping motion directions are outputted. In the exercise support system of the present embodiment, the player is located in an area 22H that is a home position when not performing a stepping motion. The player then performs stepping motions in any of the forward, left, right, and backward directions according to stepping motion instruction timings instructed by the display monitor. The upward, right, left, and downward directions that are the moving mark arrow directions displayed on the display monitor correspond to the forward, right, left, and backward directions on the foot switch 21. Specifically, when the stepping motion instruction instructed by the display monitor is the upward direction, the forward direction stepping motion on the foot switch 21 corresponds to that instruction. However, it is assumed that the player has no feeling of unease with such an association.

Any known technique may be applicable to the configuration and principle for detecting the stepping motions by the foot switch 21 and therefore no detailed explanation will be provided. For example, please refer to the mat switch discussed in Japanese Patent No. 2816837, or the sheet-like foot switch discussed in Japanese Laid-Open Patent Publication No. 2000-293292. These documents are incorporated herein as reference.

As illustrated in FIG. 3, the mat 2 of the present embodiment is configured to read player-specific data (referred to below as "player ID") via an authentication card previously distributed to the player. The mat 2 is configured to transmit the player ID to the information processor apparatus 1. Consequently, the player can confirm their own evaluation results on the display monitor using any of the numerously distributed mats 2 in the mat group 20 and a usage history of the player can be recorded in the information processor apparatus 1. By enabling the mat 2 as a usage form of the exercise support system of the player to read the authentication card before starting to use the mat 2, the evaluation results and/or the usage history of the players can be associated with the players before and after changing even if, for example, a change of the player using a specific mat 2 is carried out during a song for example.

As illustrated in FIG. 4, the signal processing unit 22 of the mat 2 of the present embodiment includes a card reader 21, a low pass filter (LPF) group 25, a transmitting data generating unit 26, and a communication interface (I/F) 27. Signals SW_U, SW_R, SW_L, and SW_D are switch outputs (e.g., an ON signal when a stepping motion is detected and an OFF signal when a stepping motion is not detected) detected in respective detection areas 22U, 22R, 22L, and 22D. LPFs of the LPF group 25 are provided for eliminating high frequency component noise of the signals SW_U, SW_R, SW_L, and SW_D to prevent faulty detections.

The card reader 21 may be any device that is able to read a player ID recorded on the authentication card. For example, the card reader 21 may be an IC card reader if the authentication card is an IC card (whether contact type or non-contact type). A reader/writer that performs communication with an IC card may be provided in the card reader 21 if the authentication card is a non-contact type IC card.

The transmission data generating unit 26 performs digital processing on the noise-eliminated switch outputs to generate detection data, and generates transmission data that includes the detection data, the player ID read from the card reader 21, and a unique mat ID previously assigned to each mat of the mat group 20.

The communication interface 27 includes a wireless communication circuit that acts in accordance with a wireless communication protocol previously determined with the information processor apparatus 1. The communication interface 27 generates wireless signals superimposed on a certain carrier to transmit the transmission data generated by the transmission data generating unit 26 to the information processor apparatus 1.

(3-2) Information Processor Apparatus

Figure 5:
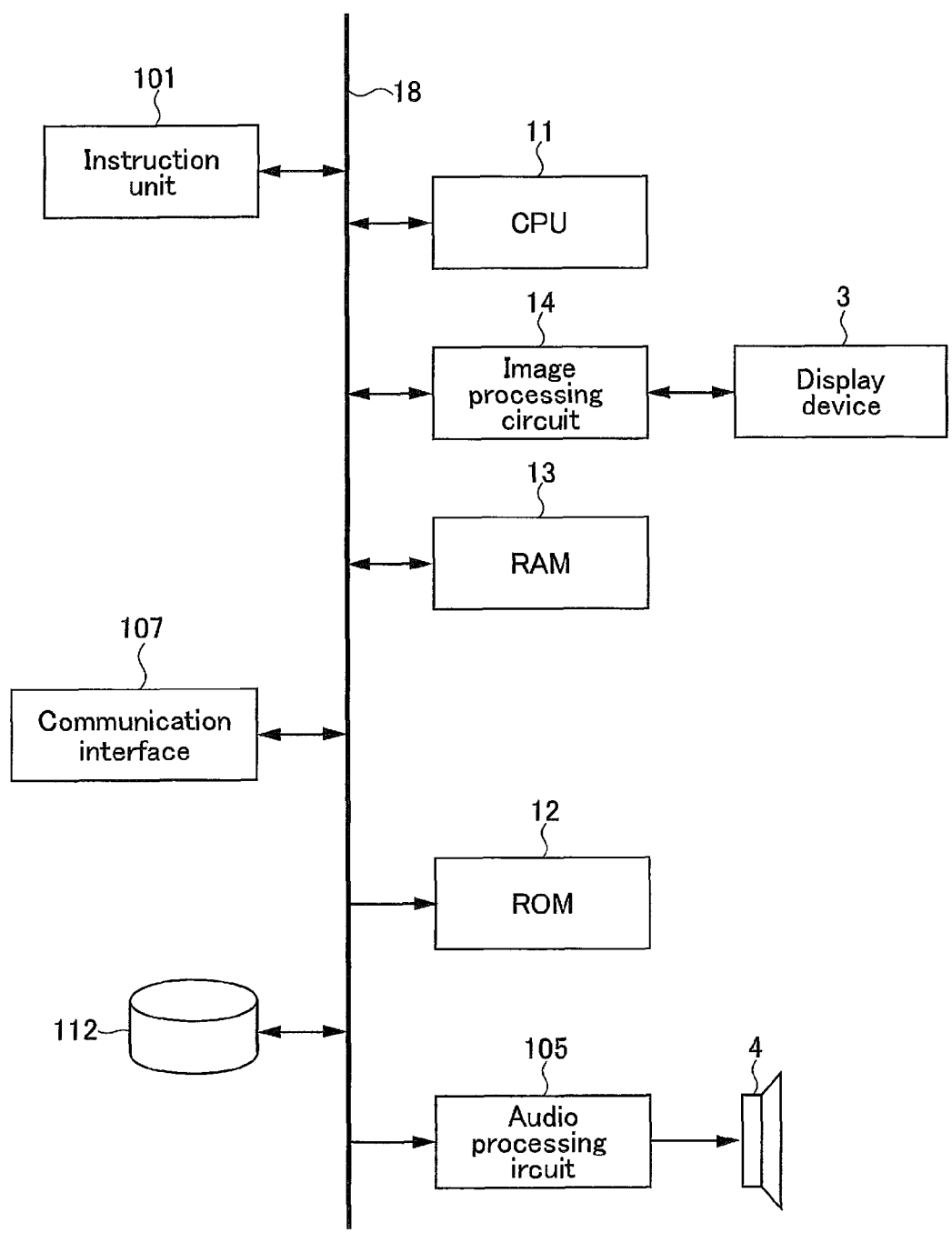
FIG. 5 illustrates a main hardware configuration of an information processor apparatus of the embodiment.
Figure 6:
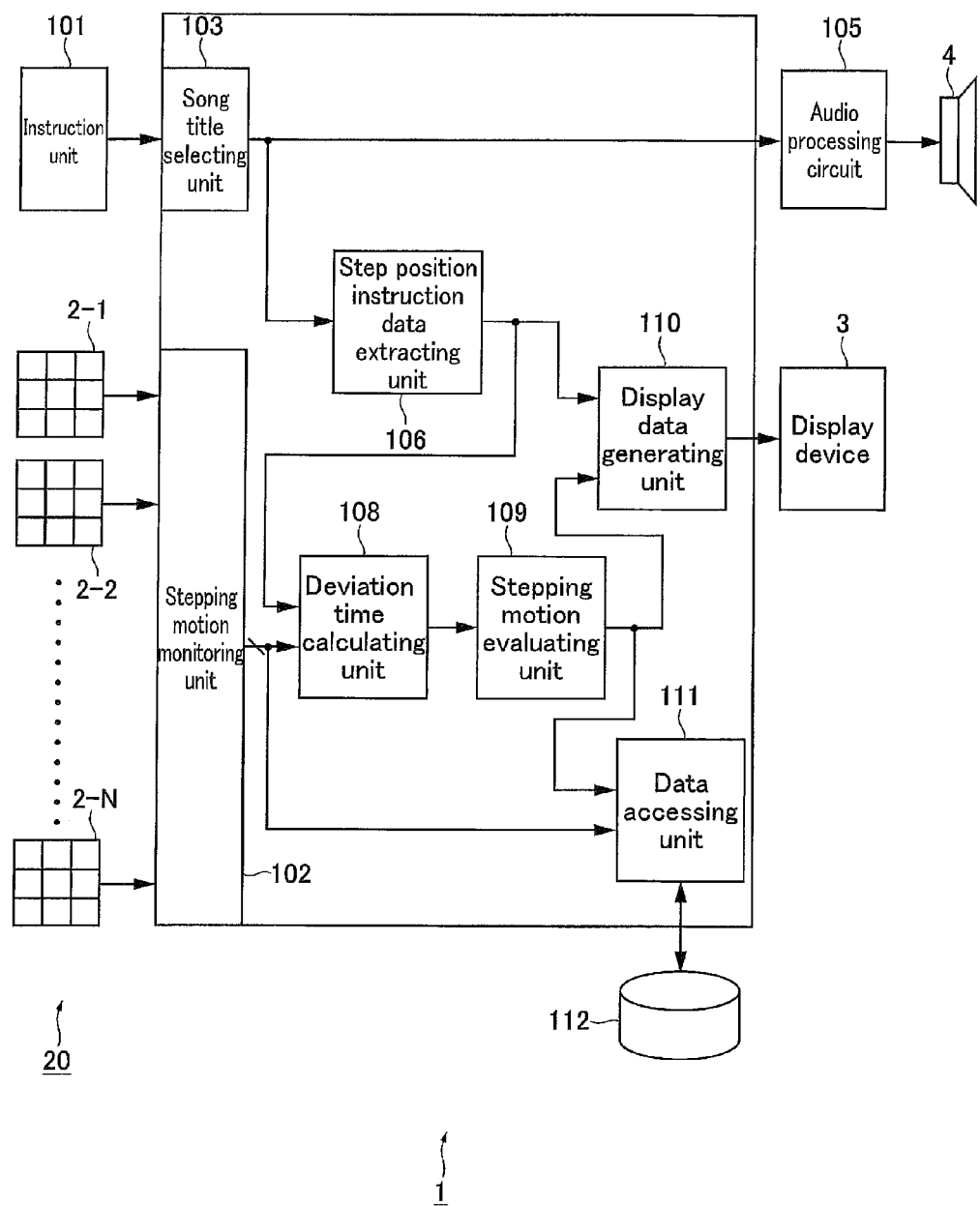
FIG. 6 illustrates main functional blocks of the information processor apparatus of the embodiment.

Next, a description of the information processor apparatus 1 that is a first embodiment of the exercise support device of the present invention will be provided with reference to FIGS. 5 and 6. FIG. 5 illustrates a main hardware configuration of an information processor apparatus 1 of the present embodiment. FIG. 6 illustrates main functional blocks of the information processor apparatus 1 of the present embodiment.

As illustrated in FIG. 5, the information processor apparatus 1 includes a central processing unit (CPU) 11, a read-only memory (ROM) 12, a random access memory (RAM) 13, an image processing unit 14, an instruction unit 101, a communication interface unit 107, an audio processing circuit 105, the speaker 4, and a storage 112. A bus 18 is provided for transmitting control signals or data signals among the components. The information processor apparatus 1 may be able to be realized by, for example, a general purpose personal computer.

The CPU 11 controls the entire information processor apparatus 1 by conducting timing control, data control, and various operation processes, and loads programs from the ROM 22 into the RAM 23 and sequentially executes the programs.

The instruction unit 101 includes, for example, an operation input unit that is provided outside of the information processor apparatus 1, and an input circuit for converting inputs to the operation input unit into electrical signals and sending the electrical signals to the CPU 11. The instruction unit 101 is provided for a player or the system operator and the like to select song titles.

The audio processing circuit 105 includes a circuit for converting digital data of songs recorded with ADPCM data, for example, into sequential (i.e., chronological) analog signals, and an amplifier for amplifying the analog signals for transmission to the speaker 4. The audio processing circuit 105 and the speaker 4 constitute an output means for outputting music.

The image processing circuit 14 generates horizontal synchronizing signals and vertical synchronizing signals for display and transmits the signals to the display device 3, sequentially fetches display data temporarily held in the RAM 13, and generates data signals for display and scanning signals for screen scanning and transmits the signals to the display device 3. For example, the display unit 3 is a liquid crystal display (LCD) monitor including thin-film transistors arranged in a matrix on a pixel-by-pixel basis. The display unit 3 displays a certain image by driving the thin-film transistors on the basis of the signals provided by the image processing circuit 14.

The communication interface 107 includes a wireless communication circuit that operates in accordance with the wireless communication protocol previously determined between the communication interface 107 and the mat 2. The communication interface 107 receives detection signals from the mat 2 and converts the detection signals to digital data (detection data).

The storage 112 may be configured, for example, by a hard disk device or by a non-volatile memory having a relatively large capacity such as a flash memory. The storage 112 is provided for compiling evaluation data for each player ID and data (e.g., belowmentioned usage data and usage history data and the like) of each player ID.

(4) Functional Blocks of Information Processor Apparatus

As illustrated in FIG. 6, the information processor apparatus 1 includes, from the viewpoint of functionality, a stepping motion monitoring unit 102, a song title selecting unit 103, a step position instruction data extracting unit 106, a deviation time calculating unit 108, a stepping motion evaluating unit 109, a display data generating unit 110, and a data accessing unit 111.

The stepping motion monitoring unit 102 includes a function to monitor the stepping motions of the players from each of the plurality of mats 2-1 to 2-N (N=32 in FIG. 1). The function of the stepping motion monitoring unit 102 is realized as described below. The communication interface 107 receives data from the mats 2 and converts the data into sequential digital data (detection data, player motion information) with a multiplexer. The CPU 11 reads the detection data from the mats 2 for each player to judge the contents of the stepping motions of the players. The stepping motion monitoring unit 102 is an example of an input means.

The song title selecting unit 103 includes a function for receiving an instruction signal from the instruction unit 101 to select the corresponding song title, and then outputting the audio digital data of the song to the audio processing circuit 105. The function of the song title selecting unit 103 is realized for example as described below. The audio digital data of a plurality of songs is stored in the ROM 12. The CPU 11 selects the audio digital data of any song in the ROM 12 on the basis of an instruction signal received from the instruction unit 101 and outputs the audio digital data to the audio processing circuit 105.

The step position instruction data extracting unit 106 includes a function for extracting step position instruction data corresponding to the selected song. In the present embodiment, the step position instruction data is data that describes a display direction of a moving mark to be displayed on the screen, and describes an appearance timing and a movement path of the moving mark. Specifically, the step position instruction data includes data corresponding to each of the moving marks to be displayed. The movement path depicts positions on the screen in accordance with the passage of time based on the appearance timing. An appearance position instead of the movement path may be described in the step position instruction data if the moving directions and movement speeds of the moving marks are predetermined.

The function of the step position instruction data extracting unit 106 is realized as described below. The step position instruction data corresponding to beats that constitute the rhythm (four-beat, eight-beat, etc.) of each song is stored in the ROM 12. The step position instruction data is preferably created in accordance with the rhythm of the song (music) to be outputted, and accordingly, the display pattern of the moving marks are preferably generated and displayed in accordance with the rhythm of the song. For example, if the rhythm is a four-beat rhythm, one data set is made up of four sets of the step position instruction data that correspond to four consecutive beats. For example, if the rhythm is an eight-beat rhythm, one data set is made up of eight sets of the step position instruction data that correspond to eight consecutive beats. The data of one song is made up of a plurality of data sets. The step position instruction data may be data that corresponds to a song with various rhythms. For example, if the rhythm is a four-beat rhythm, the step position instruction data may be data in which all of the four beats have the same gaps therebetween, or the first two beats may be short and the last two beats may be slow. The step position instruction data extracting unit 106 sequentially extracts the step position instruction data for each data set from the ROM 12 during the output of one song.

As described above, a plurality of display patterns with varying levels of difficulty are provided as a series of moving mark display patterns in the same song in the present embodiment. More moving marks are added to a display pattern with a higher level of difficulty than are to a display pattern with a lower level of difficulty. Accordingly, sets of step position instruction data having different levels of difficulty of play are prepared for the same song. When a song is selected, the CPU 11 sequentially extracts prepared step position instruction data of a plurality of levels of difficulty for the selected song from the ROM 12 in units of one data set. For example, if three levels of difficulty are set as "STANDARD", "ADVANCED", and "EXPERT" as illustrated in FIG. 2, the CPU 11 sequentially extracts one data set for each level of difficulty (in this case, three data sets).

The deviation time calculating unit 108 includes a function for calculating a deviation time with respect to each step position instruction data for each player ID from a stepping motion instruction timing based on the step position instruction data extracted by the step position instruction data extracting unit 106 and from a timing in which the stepping motions are actually performed as recognized by the stepping motion monitoring unit 102. The function of the deviation time calculating unit 108 is realized as described below. The CPU 11 recognizes the contents of the stepping motions (any of the forward, backward, left, and right directions) and the timing of the stepping motions of the players on the basis of detection data from the mats 2 read for each player ID. The CPU 11 recognizes the moving mark display directions described in the step position instruction data, and the appearance timings and the movement paths of the moving marks. However, the CPU 11 does not calculate the deviation time if the contents of the stepping motions of a player do not correspond with the display directions of the moving marks. If the contents of the stepping motions of a player correspond with the display directions of the moving marks, the CPU 11 calculates the deviation time by measuring the timing at which the moving mark overlaps the stationary mark based on an internal timer and derives a difference between the measured timing and the timing of the stepping motion of the player.

The stepping motion evaluating unit 109 includes a function for evaluating the stepping motions of a player on the basis of the deviation time calculated by the deviation time calculating unit 108 for each step position instruction data, that is, for each moving mark. The function of the stepping motion evaluating unit 109 is realized as described below. The CPU 11 normalizes the deviation times calculated for each moving mark based on a score, for example, between 0 and 100. For example, the CPU 11 establishes a score for an evaluation of the stepping motions with a deviation time of zero as 100 points, and causes the score to approach zero points as the deviation becomes increasingly large. The setting of the score in correspondence with the size of the deviation time may be conducted as appropriate. In the present embodiment, an index corresponding to the score of the player stepping motions is sequentially displayed for each moving mark so that the player is able to visually recognize the stepping motion evaluation results for themselves.

The stepping motion evaluating unit 109 is an example of an evaluating means.

Evaluations of player stepping motions for a specific song are conducted by the stepping motion evaluating unit 109 as described below. As illustrated in FIG. 2, in order to correctly evaluate a player's stepping motions in the exercise support system, an evaluation is preferably conducted on the basis of a number of suitable stepping motions (e.g., a stepping motion in which the timing of the moving mark and the stationary mark have a high level of coincidence) performed since the number of moving marks included in a display pattern increases according to the order of "STANDARD", "ADVANCED", "EXPERT" and the player is able to change the level of difficulty during a song based on their own judgment. Specifically, since the number of moving marks that appear in the "STANDARD" level of difficulty is small, a relatively high evaluation cannot be achieved even if a player who selects only the "STANDARD" level of difficulty performs the stepping motion with a high level of accuracy for all of the moving marks. A higher evaluation is preferably achieved by the player performing as high a number of accurate stepping motions as possible in a display pattern with a high level of difficulty in which a higher number of moving marks appear. The determination of whether a level of coincidence between the moving marks and the stationary marks when a player is performing the stepping motions can be conducted on the basis of whether the score based on the deviation time is equal to or greater than a certain threshold (e.g., 80 points).

The display data generating unit 110 includes a function for generating display data to output to the display device 3. The display data generated by the display data generating unit 110 is data for images as illustrated for example in FIG. 2. To realize the function of the display data generating unit 110, the CPU 11 replaces the step position instruction data extracted for each data set with moving marks for generating the display data. The CPU 11 converts the evaluation results (score) of the moving mark stepping motions by each player to certain bar form images (described below). The image processing circuit 14 then generates the display data at a certain frequency (e.g., 1/60 seconds) so that the moving marks are displayed in a scrolling manner with the appearance timings and the movement paths described in the step position instruction data, and so that the bars that indicate the evaluation results are updated and displayed for each moving mark.

The display data generating unit 110 preferably establishes display modes that are different from each other with the moving marks Mm1 that make up the "STANDARD" display pattern, the moving marks Mm2 that are added to the "ADVANCED" display pattern, and the moving marks Mm3 that are added to the "EXPERT" display pattern as described with reference to FIG. 2. By establishing such display modes, the changing of the display pattern during the motions may be conducted more smoothly to allow the moving marks that are added or removed and are particularly closely followed by the player when changing the display pattern selection, to be recognized more easily by the player. Different display modes may be represented by, for example, differences in color or patterns, differences in brightness, or differences in brightness changes such as shining or flashing.

The display data generating unit 110 is an example of an instructing means.

The data accessing unit 111 includes a function for accessing the storage 112 for reading various data for each player ID from the storage 112 or writing various data in the storage 112. The data accessing unit 111 manages a player ID using a specific mat among the mat group 20 on the basis of the player ID and the mat ID included in the detection data from the mats 2. The function of the data accessing unit 111 is realized by the CPU 11 writing an operation result in a specified address of the storage 112, or by the CPU 11 reading data of a specified address from the storage 112.

FIG. 7 is an example of data recorded in the storage 112. The example illustrated in FIG. 7 includes, for each player ID, current usage data, and usage history data that indicates a usage history up to the present time. The current usage data may include data such as the mat ID (usage mat ID) included in the detection data from the mats, an affiliated team, an evaluation, a continuous usage time, and energy expenditure. The affiliated team may be, for example, any of the teams A to D corresponding to the display areas 3A to 3D illustrated in FIG. 2. The affiliated team may be previously associated with a mat ID and may be data included in the detection data from the mats. The evaluation may be an integrated value of the number of times that the stepping motions have been performed appropriately under the current usage as described above. The continuous usage time may be a time measured from the point in time the current usage started and may be measured, for example, by an internal timer in the CPU 11. The energy expenditure may be, for example, a value calculated by the CPU 11 by converting the continuous usage time using a certain conversion equation. The usage history data may include, for example, data of an aggregate usage time. The aggregate usage time is, for example, an integrated value of the continuous usage time up to the present.

(5) Information Processor Apparatus Operation

Figure 8:
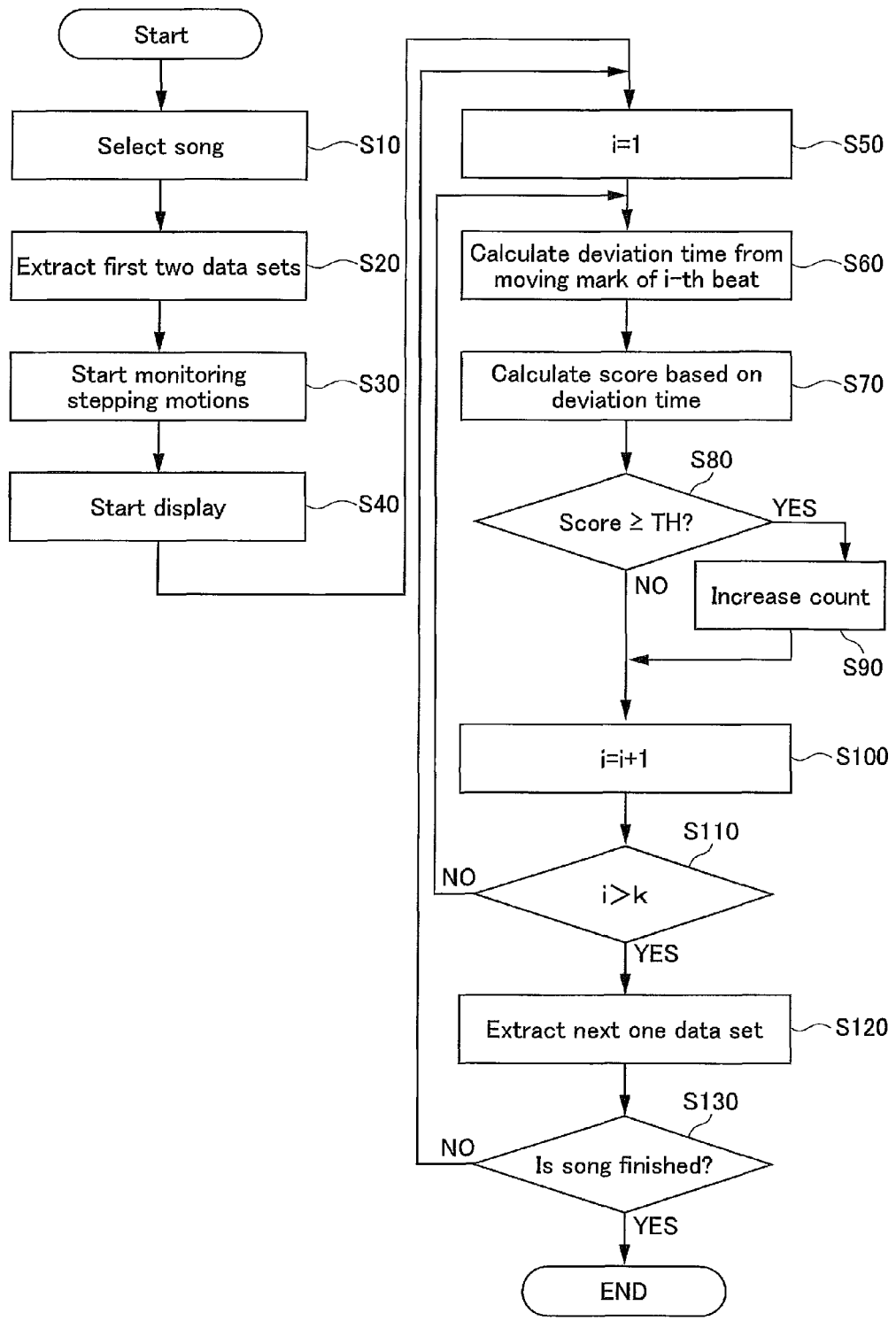
FIG. 8 is a flow chart of main operations of the information processor apparatus of the embodiment.

The following is a description with reference to the flowchart of FIG. 8 of main operations of the information processor apparatus 1 of the present embodiment.

First, when a song title is selected from a plurality of song titles displayed in a list, for example, according to a certain instruction input operation in the instruction unit 101 of the information processor apparatus 1 (step S10), the song title selecting unit 103 selects the audio digital data corresponding to the selected song title from the ROM 12 and outputs the audio digital data to the audio processing circuit 105. The song is then outputted from the speaker 4. When the output of the selected song is started, the step position instruction data extracting unit 106 extracts from the ROM 12 two data sets of each of the step position instruction data corresponding to the display patterns of the plurality of levels of difficulty ("STANDARD", "ADVANCED", "EXPERT") provided for the selected song (step S20). The display data generating unit 110 holds the extracted two data sets in the RAM 13, replaces the step position instruction data included in the first one data set among the two data sets with moving marks, and starts the scrolling display of the moving marks as illustrated in FIG. 2 (step S40).

The display patterns of the three levels of difficulty of "STANDARD", "ADVANCED", and "EXPERT" are displayed in parallel at the same time for the song selected in step S10 in the scrolling display. The "ADVANCED" display pattern is formed to include the moving marks that make up the "STANDARD" display pattern and to include additional moving marks. The "EXPERT" display pattern is formed to include the moving marks that make up the "ADVANCED" display pattern and to include additional moving marks. As a result, the player is able to select any of the "STANDARD", "ADVANCED", or "EXPERT" display patterns based on their own judgment to perform the stepping motions. The player is free to change the level of difficulty of the display pattern that represents the stepping motion target during the song.

It is assumed herein that the amount of data that can be displayed on the display device 3 at the same time is data for two data sets when extracting the two data sets; however, the present embodiment is not limited as such. The amount of data to be extracted may be set in accordance with the capacity of the RAM 13 and the like.

The steps S50 to S110 represent processing conducted in player ID units on the step position instruction data included in one data set, and it is assumed herein that a maximum of k sets (i.e., the number for the "EXPERT" level of difficulty in which the most moving marks appear) of the step position instruction data (k number of beats, k number of moving marks) is included in one data set. First, a variable i is initialized (step S50). The deviation time calculating unit 108 then calculates the deviation time with respect to the moving marks of the i-th beat (where i=1 to k) (step S60). Next, the stepping motion evaluating unit 109 conducts a process to convert the deviation time calculated by the deviation time calculating unit 108 to a score (0 to 100 points) as an evaluation of the stepping motions (step S70). A determination is made as to whether the score calculated in step S70 is equal to or greater than a certain threshold (TH), that is, for example, greater to or equal than 80 points (step S80). If the score is equal to or greater than the certain threshold, a value of a counter for the evaluation is increased (step S90). The processing in the steps S60 to S90 is repeated until the processing of the final step position instruction data in the one data set to be processed is completed (steps S100, S110).

When the processing of the one data set is completed, the next data set of the song being output from the RAM 13 is retrieved to start the processing and the subsequent data set is extracted from the ROM 12 and saved in the RAM 13 (step S120). The above processing is conducted sequentially until the processing of all the data sets of the step position instruction data is completed for the song being output (i.e., until the song is finished) (step S130). The value of the counter at the point in time the song is finished becomes the number of times that stepping motions have been performed appropriately by the player.

As described above, display patterns of a plurality of levels of difficulty are displayed at the same time on the screen of the display device 3 in the exercise support system of the present embodiment. As a result, a player is able to select any of the display patterns as desired without performing a special operation during the motions and can then perform the motions in accordance with the selected display pattern.

Further, the plurality of display patterns of the exercise support system of the present embodiment includes at least a first display pattern and a second display pattern, and the second display pattern is formed to include the moving marks of the first display pattern and include additional moving marks. Specifically, when the first display pattern is set as the "STANDARD" display pattern, the "ADVANCED" display pattern that is the second display pattern is formed to include the moving marks of the "STANDARD" display pattern and also include additional moving marks. When the first display pattern is set as the "ADVANCED" display pattern, the "EXPERT" display pattern that is the second display pattern is formed to include the moving marks of the "ADVANCED" display pattern and also include additional moving marks. As a result, when a player changes the selection of the display pattern to either of the "STANDARD", "ADVANCED", or "EXPERT" display patterns, the player is able to smoothly perform the change during the motions so long as the player is paying close attention to the added or removed moving marks.

(6) Evaluation Result Display Method (6-1) Display Method of Evaluation Results (Score) for Each Moving Mark The display method for the evaluation of the moving marks in the exercise support system of the present embodiment will be described with reference to FIGS. 9 to 11. The display method described below may be realized by functions of the stepping motion evaluating unit 109 and the display data generating unit 110.

It is assumed, for example, that a relatively large number of players are playing while watching one display screen at the same time in the exercise support system of the present embodiment. Furthermore, as described above, a player is interested in their own stepping motion evaluation results with respect to the individual moving marks since the stepping motions of the player are evaluated according to the number of times appropriate stepping motions are performed with respect to the moving marks. Accordingly, it is desirable in the exercise support system of the present embodiment that the evaluation result for each moving mark is displayed in the display device so that a multitude of players are able to visually recognize the evaluation results for each of the moving marks of individual players when the players are playing while watching one display screen at the same time. Specifically, a text indicating the names of the players who are playing and the evaluation results of the player stepping motions are displayed in the display areas 3A to 3D as illustrated in FIG. 2.

The text indicating the name of the player may be, for example, previously recorded in the player's authentication card and the mat 2 may read the text data from the authentication card and include the text data in the transmission data transmitted to the information processor apparatus 1. In this case, the data accessing unit 111 is configured to write the player ID in association with the text indicating the player's name in the storage 112.

FIGS. 9(a) to 9(d) depict display modes of the evaluation results of player stepping motions when the player stepping motions with respect to the moving marks are depicted in order from a time t0 to a time t3. The display modes include a display area 200 for displaying the direction in which the player performs the stepping motion, and a display area 201 for displaying with a bar height the evaluation results of the player's current stepping motions and those for a plurality of times in the past (see FIG. 2). The bar height display is an example of an index for indicating a level of coincidence of the moving mark and the stationary mark with respect to each moving mark. As illustrated in FIG. 9, the display area 200 is divided into four partial areas that correspond to the four directions of up, down, left, and right. The display mode of the partial areas for any of the directions of up, down, left, and right is configured to change in accordance with a stepping motion in any of the forward, backward, left, and right directions of the player on the mat 2. Any of various change forms such as a change in a color or pattern or a change such as shining or flashing may be used as the change of the display mode. The example illustrated in FIG. 9 indicates that the player stepping motions are performed in the order of the directions of left→back left→front with respect to the moving marks for reaching the stationary marks in order.

Figure 9:
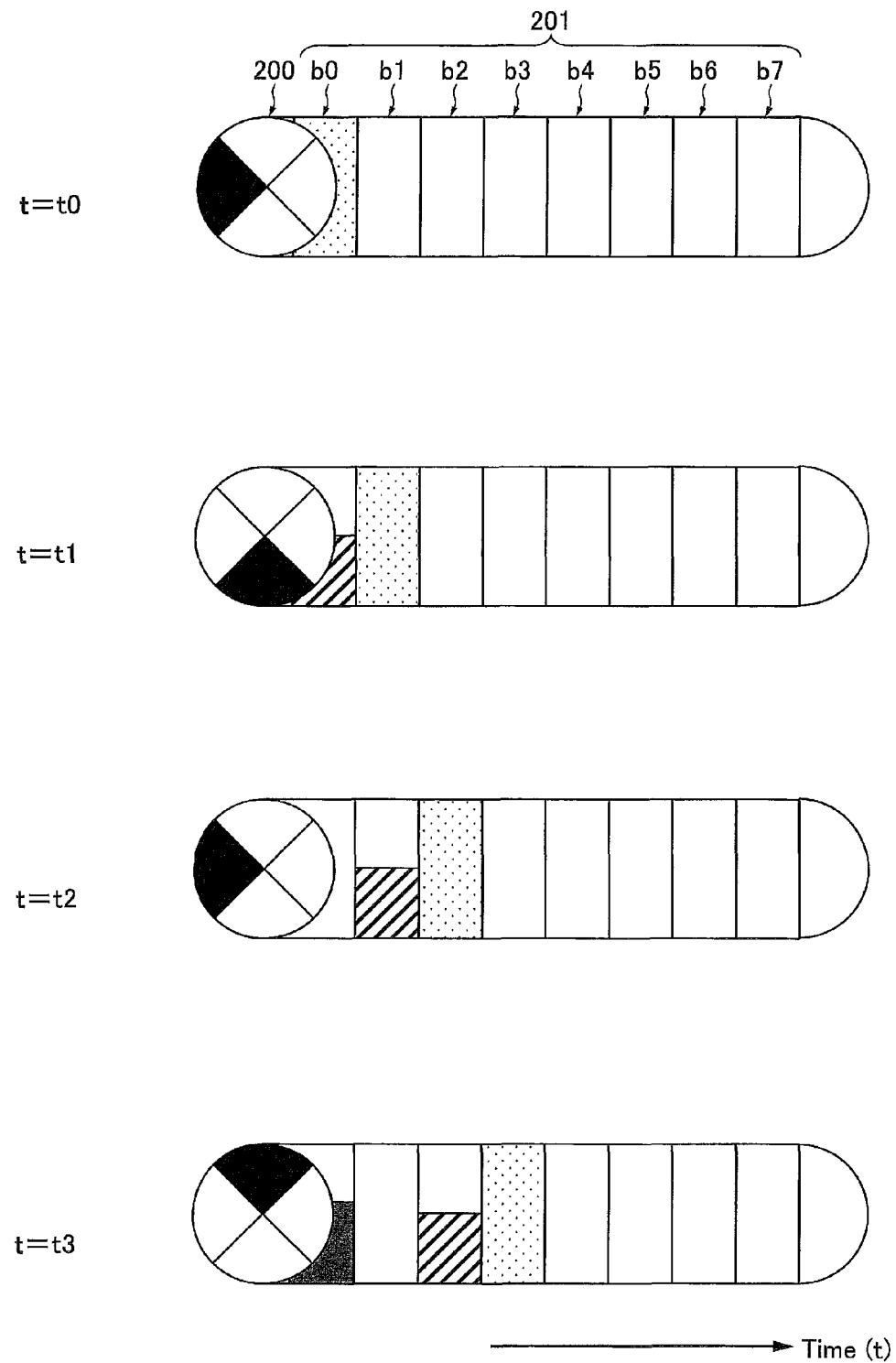
FIG. 9 is an example of display modes of evaluations of moving marks in the exercise support system of the embodiment.

In the example illustrated in FIG. 9, the display area 201 includes a plurality of partial areas b0 to b7 for indicating newer evaluation results in order. For example, the evaluation result of a player stepping motion at the time t0 with respect to a certain moving mark is displayed in the partial area b0. The display of the evaluation results may be conducted so that the score of the evaluation of the stepping motion is reflected as a bar height. For example, the bar height is the highest when the score of the stepping motion evaluation is 100 points, and the bar height is the lowest (e.g., the display of the bar disappears) when the score of the stepping motion evaluation is 0 points. When the time t1 is reached and the evaluation result with respect to the next moving mark is determined, that evaluation is displayed in the partial area b0, and the bar indicating the evaluation results displayed in the partial area b0 at the time t0 is shifted to the partial area b1. Similarly, each time an evaluation result with respect to a subsequent moving mark is determined, the bar indicating the latest evaluation result is displayed in the partial area b0 and the bars indicating past evaluation results are sequentially shifted to the right. Consequently, the bars indicating the evaluation results while playing is performed are displayed by scrolling to the right when watching the entire display.

The evaluation result at the point in time of the time t2 indicates that, although the player performed a stepping motion to the left, the arrow indicating the moving mark did not indicate the left direction, or the timing deviated widely even though the arrow indicating the moving mark did indicate the left direction and thus the score resulted in zero points. Consequently, the evaluation result displays an example in which a bar is not displayed.

The display modes of the evaluation result bars displayed in the display area 201 preferably coincide with the display modes of the moving marks to be evaluated. Consequently, the players can easily associate and recognize their own evaluation results with respect to the specific moving marks.

The number of partial areas included in the display area 201 may be set as appropriate. Although only the partial area b0 that indicates the latest evaluation result may be displayed, a player can easily recognize at a glance their own evaluation results over a fixed period of time and the evaluations of other players over the fixed period of time with the scrolling display as illustrated in FIG. 9. For example, if a state continues in which the evaluation of the stepping motions is poor and the bar height is low, the player can understand at a glance that their stepping motions are not being performed well from the fill rate of the bars throughout the entire display area 201. As described above, a player can appropriately recognize their own evaluation results or those of another player displayed in the display area 201 in order for the player to be able to assess whether they are performing the stepping motions well based on the low level of difficulty display pattern or whether they are not performing the stepping motions well based on the high level of difficulty display pattern since the bar display mode and the moving mark display mode match. Moreover, a player is able to more effectively judge whether or not they should change the currently selected display pattern on the basis of the display of the evaluation result bars.

Figure 10:
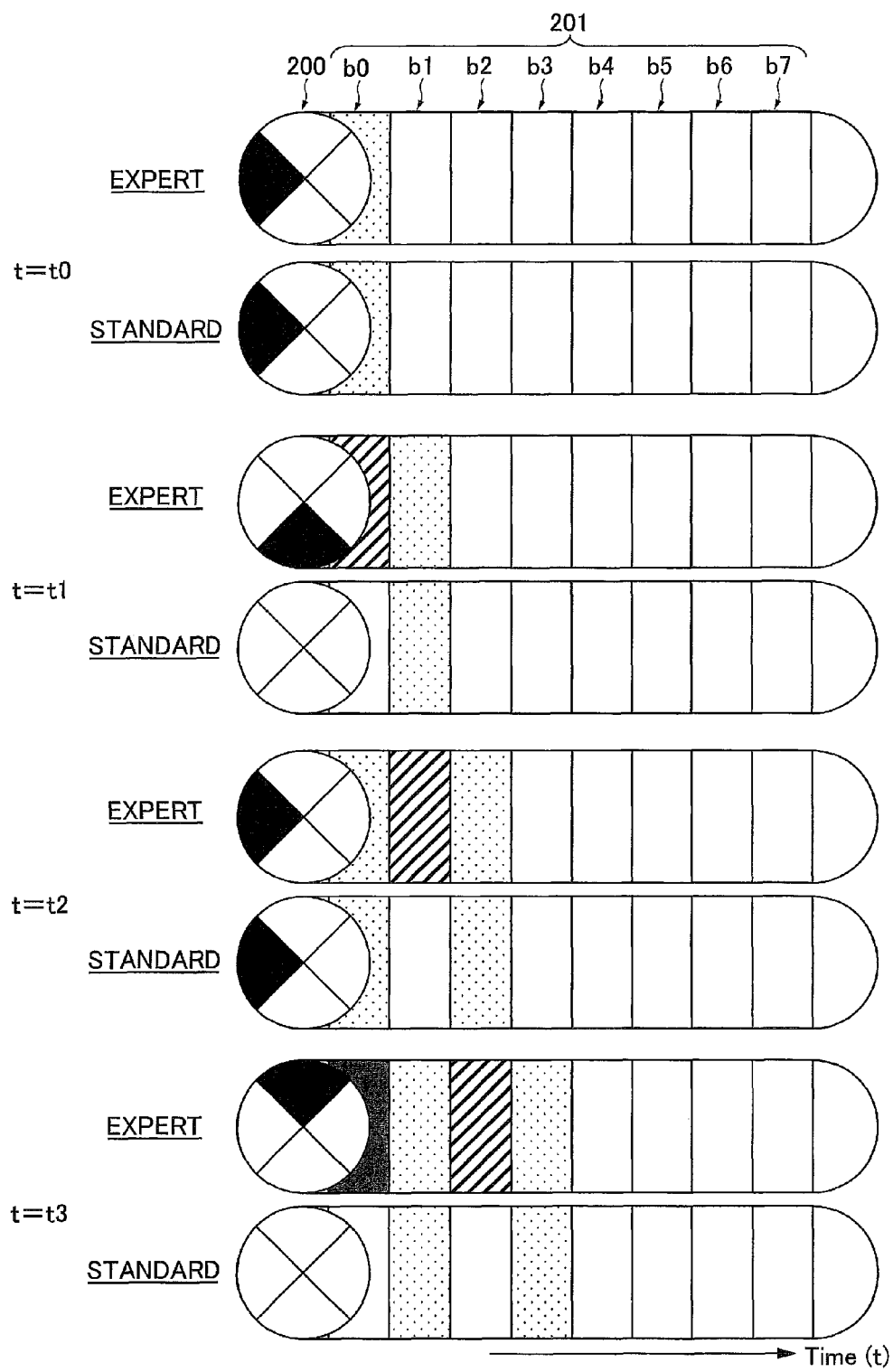
FIG. 10 is an example of display modes of evaluations of moving marks in the exercise support system of the embodiment.
Figure 11:
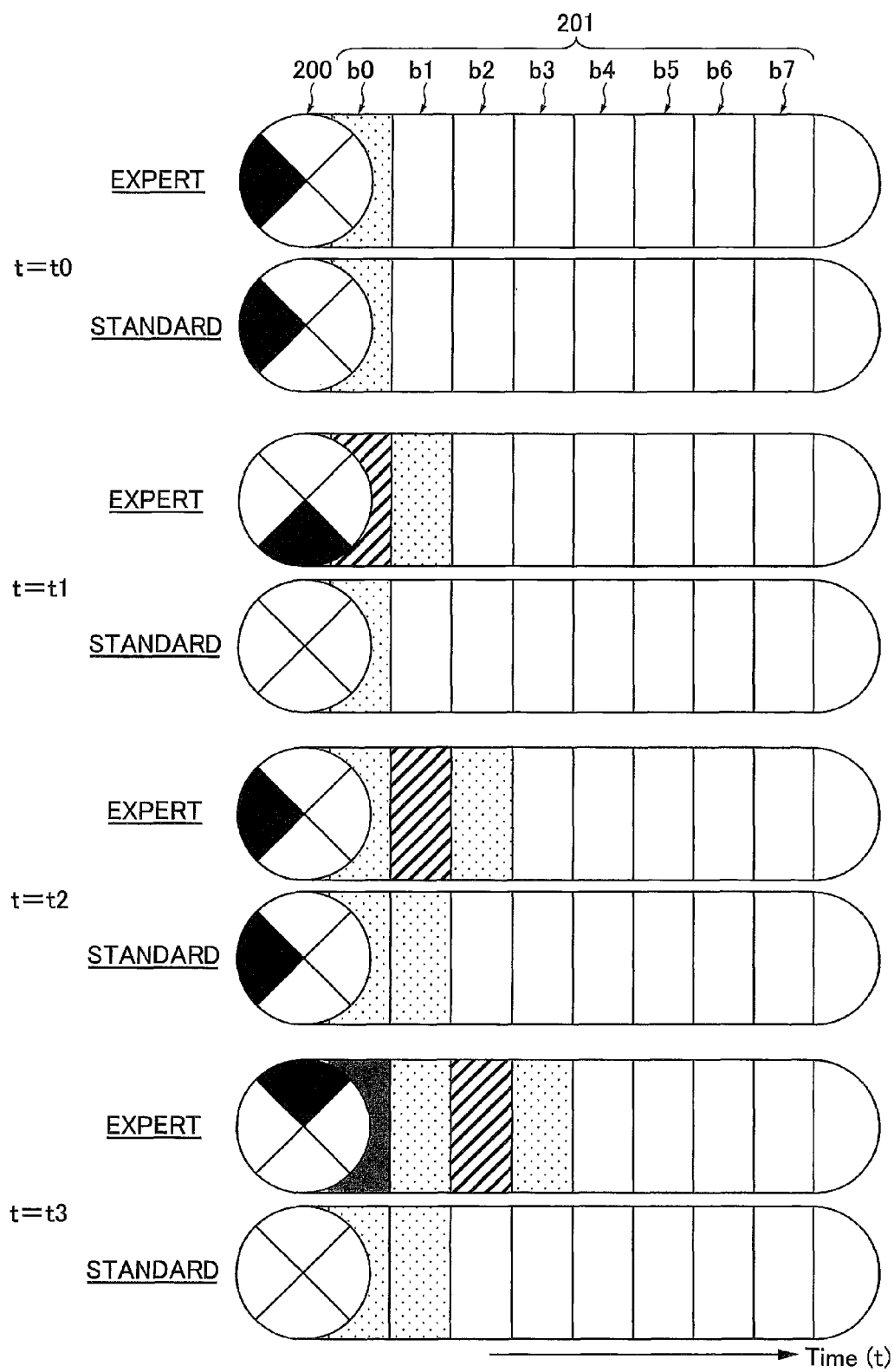
FIG. 11 is an example of display modes of evaluations of moving marks in the exercise support system of the embodiment.

FIGS. 10 and 11 illustrate examples of display timings of bars displayed in the display area 201 when a player performs the stepping motions with respect to display patterns of different levels of difficulty.

As described above, the "ADVANCED" display pattern is formed to include the moving marks that make up the "STANDARD" display pattern and also include additional moving marks, and the "EXPERT" display pattern is formed to include the moving marks that make up the "ADVANCED" display pattern and also include additional moving marks in the exercise support system of the present embodiment. As illustrated in FIG. 10, the display timing of the bars displayed in the display area 201 may be set in accordance with the display patterns of the highest level of difficulty (i.e., the most number of moving marks).

FIG. 10 illustrates an example in which the bars in the partial areas of the display area 201 are displayed accompanying the evaluation timings of the moving marks of the "EXPERT" display pattern that has the highest level of difficulty. FIG. 10 depicts display examples of the display area 201 along a time sequence (time t0 to t3) when scores for all the moving marks of a player who selects only the "STANDARD" display pattern that has the lowest level of difficulty (i.e., fewest number of moving marks) are 100, and when scores for all the moving marks of a player who selects only the "EXPERT" display pattern that has the highest level of difficulty (i.e., most number of moving marks) are 100. In this case, the bars are displayed in all the partial areas of the display area 201 when the "EXPERT" display pattern is selected. Conversely, since the number of moving marks to be evaluated is fewer when the "STANDARD" display pattern is selected, the partial areas filled with bars in the display area 201 are fewer even though the evaluation of all the moving marks indicates 100 points. For example, at the time t1, the player who selected the "STANDARD" display pattern does not perform a stepping motion since a moving mark to be evaluated does not appear in the "STANDARD" display pattern and therefore no bar is displayed in the partial area b0.

A player is able to understand more appropriately their own evaluation results or those of another player based on the display modes in the display areas 201 illustrated in FIG. 10. Specifically, even if a high score is achieved for all the moving marks in a display pattern with a low level of difficulty, the fact that the evaluation is not high can be understood at a glance since the area of the bars filling the display area 201 is smaller in comparison to when a high score is achieved for all the moving marks in a display pattern with a higher level of difficulty.

FIG. 11 illustrates an example in which the display timings of the bars displayed in the display area 201 are different from those of FIG. 10. In FIG. 11, the bars are displayed as evaluation results in the partial areas of the display area 201 whenever a player performs a stepping motion regardless of the level of difficulty. For example, at the time t1, the player who selected the "STANDARD" display pattern does not perform a stepping motion since a moving mark to be evaluated does not appear in the "STANDARD" display pattern and therefore the bar for indicating the evaluation of the stepping motion at the time t0 remains in the partial area b0. When the player who selected the "STANDARD" display pattern performs another stepping motion, a bar is displayed as the evaluation result for the other stepping motion in the partial area b0 at the time t2.

By using the display modes of the display area 201 illustrated in FIG. 11, the player can easily understand the evaluations of their own stepping motions with respect to the moving marks, or the evaluations of another player since bars are displayed as the evaluation results in all the partial areas of the display area 201 regardless of the display pattern selected by the player. For example, although a player cannot assess whether they have not performed the appropriate stepping motions properly or whether the stepping motions in accordance with the display pattern selected by the player were not performed using the display modes in FIG. 10 when the bars are not displayed as the evaluation results of another player, the player can understand that the appropriate stepping motions were not performed properly according to the display modes in FIG. 11.

(6-2) Display Method for Evaluation Results in Team Units

The exercise support system preferably includes the display of evaluations of a player's stepping motions or the display of evaluations of stepping motions in team units for a specific song or over a plurality of songs when a plurality of players are divided into a plurality of teams, on the display device 3 with a display mode that allows comparison. Consequently, a competitive spirit between players or between teams is stimulated and a game element is added to enable the support for the players' exercise.

Figure 12:
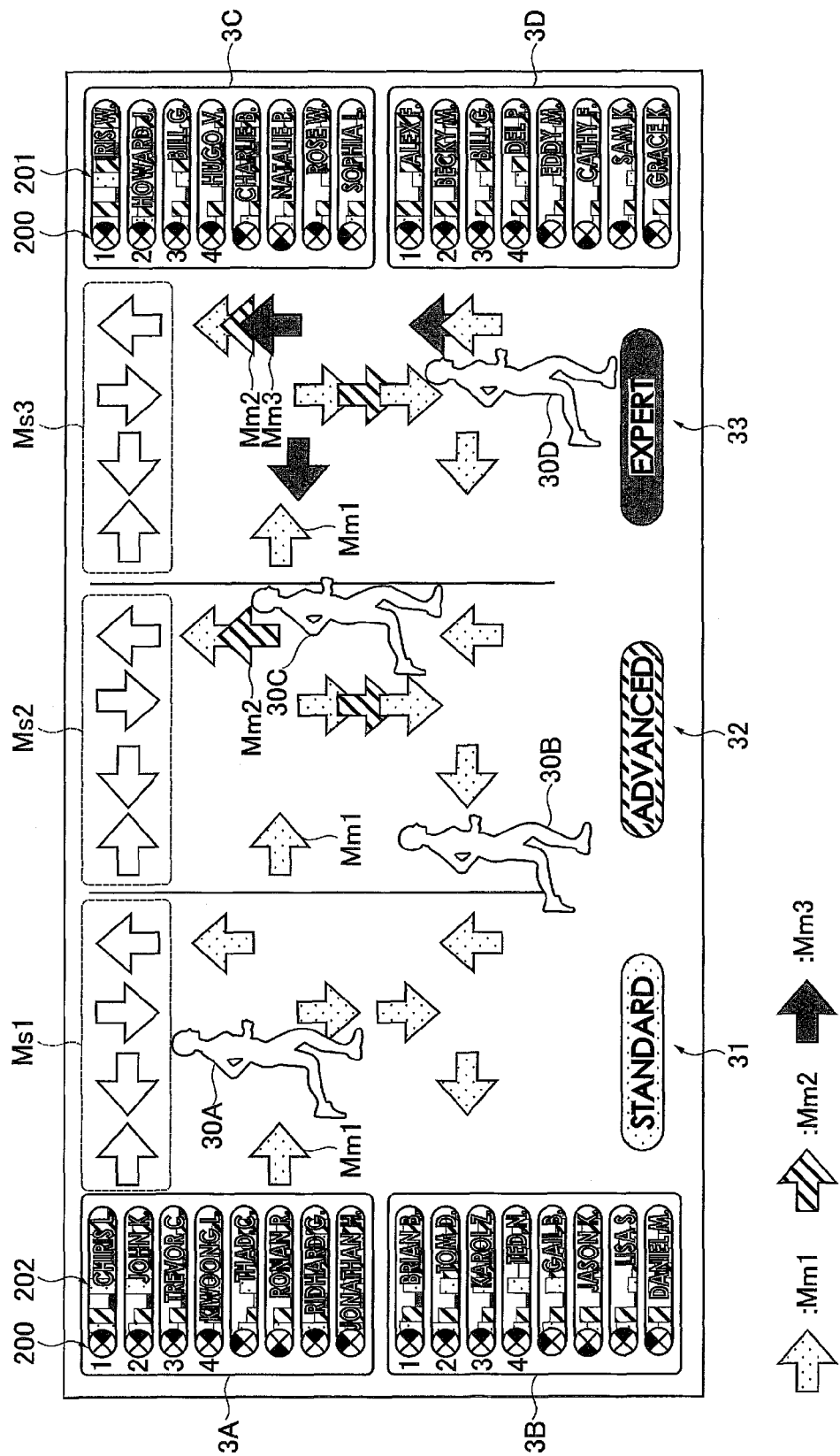
FIG. 12 illustrates an example of display modes of evaluations in units of player teams in the exercise support system of the embodiment.

FIG. 12 illustrates an example of stepping motion evaluations in team units displayed on the display device 3. In FIG. 12, an example is illustrated in which teams A to D displayed in the display areas 3A to 3D are configured of eight players each, and running images 30A to 30D are displayed with respect to the evaluation results of each team. In the display device 3, the evaluation results of a team corresponding to an image advancing further to the right among the images 30A to 30D represents the most desirable results. Since the images are displayed, for example, from the right in the order of 30D, 30C, 30B, and 30A in FIG. 12, the performances of the teams are considered better in the order of team D, team C, team B, and team A. The evaluations of the teams may be decided on the basis of a total of the number of times that the plurality of players affiliated with the team performs the stepping motions appropriately.

The evaluations of the stepping motions for each player and the evaluations of the stepping motions for each team are not limited to the methods illustrated in FIG. 12, and any display mode may be adopted so long as the format allows comparison. For example, a bar that extends from the left to the right for each player or for each team may be displayed. In this case, a longer bar length (i.e., extending further to the right) corresponds to a higher evaluation. Alternatively, the total number of appropriately performed stepping motions for each player or the total number of appropriately performed stepping motions for each team may more easily be displayed with a digital numerical value.

While embodiments of the present invention have been described in detail up to this point, the present invention is not limited to the above embodiments and it is apparent that a variety of changes and modifications can be made without departing from the scope of the present invention.

For example, although the display patterns of a series of moving marks (motion instruction marks) are described in the above embodiment as being displayed in separate display areas as illustrated in FIG. 2, the present invention is not limited as such. The display patterns may be displayed in a distinguishable manner so that a player can select a display pattern by themselves, and for example, a plurality of display patterns may be displayed in the same display area. In this case, in order to further clarify differences between display patterns, the moving marks Mm1 that make up the "STANDARD" display pattern, the moving marks Mm2 that make up the "ADVANCED" display pattern, and the moving marks Mm3 that make up the "EXPERT" display pattern preferably have display modes that are different from each other as described for example in the above embodiment.

Although an example in which the moving marks as motion instruction marks appear at the bottom of the screen and move by scrolling upwards is described in the above embodiment, the scrolling movement mode of the moving marks is not limited as such. The moving direction of the moving marks may be set on the screen as desired and the scrolling movement of the moving marks is not necessarily required to be linear. For example, the moving marks may be set to move with a fixed regularity or in an irregular manner. For example, the moving marks may be set to move in a snaking manner after appearing on the screen.

Marks depicted as arrows pointing in the four directions of up, down, left, right have been described as examples of the motion instruction marks and the motion evaluation marks in the above embodiment; however the present invention is not limited to this example. Any symbol, sign, mark, emblem, pattern and the like may be set as the mode of the mark so long as the level of coincidence of the motion instruction mark and the motion evaluation mark can be evaluated. For example, a common symbol such as a circle or a star may be used as the motion instruction mark and the motion evaluation mark. The motion instruction mark may be depicted as a bar of a fixed size parallel to the horizontal direction of the screen, and the motion evaluation mark may be depicted as a line in the horizontal direction of the screen.

A stationary mark is used as an example of the motion evaluation mark in the above embodiment; however the motion evaluation mark is not limited to the stationary mark. The motion evaluation mark may be depicted as a mark that moves. For example, the level of coincidence of the motion instruction mark and the motion evaluation mark may be evaluated when the motion instruction mark moves as a line from one end to another end and the motion evaluation mark moves on the line in the direction opposite the moving direction of the motion instruction mark when the player has performed the motions. Specifically, the motion instruction mark and the motion evaluation mark may be stopped or may be moving so long as the player can foresee the timing for matching the motion instruction mark and the motion evaluation mark and thus the motion timing can be instructed to the player.

Although a mat provided with a foot switch is raised as an example of the motion detection device in the above embodiment, the motion detection device is not limited as such. The motion contents and the motion directions are not limited so long as the player's motions can be detected from a certain position. Specifically, in the present invention, so long as a comparison is made between the timings of the motions from a certain position of a player and the timings that are visually instructed to the player, the motions themselves of the player are not limited to the exemplary motions of the above embodiment.

Although variations of the player motion directions instructed to the player in the exercise support device may be allowed based on the detection of the directions of the player motions by the motion detection device, such allowances are not necessary. Regardless of the motion direction of the player, the exercise support device can evaluate the timings of the player's motions if at least the timings of the player's motions are understood.

An example of a player's motion other than a stepping motion is an arm motion. In this case, an arm motion detection method in the motion detection device may include various methods. For example, a motion detection device that includes a switch that conducts when a player presses the switch with their hand may be arranged in a reachable range of a player's hand, and an output of the switch may be transmitted to the exercise support device. Alternatively, a player may attach a motion detection device including an acceleration sensor to their arm or a player may hold a motion detection device that includes an acceleration sensor, and an exercise support device connected to the motion detection device may judge whether a motion by the player occurred from a certain position at a timing when the sensor output equals or exceeds a threshold.

As another example of the motion detection device, a motion detection device may be provided that detects a leg or an arm motion by the player located at the home position using an infra-red detection principle. In this case, the motion detection device may include a mat in which an infra-red radiation unit that outputs an infra-red beam upwards is arranged around a home position of the player, and a detecting unit that includes an infra-red light receiving sensor above the player. The exercise support device connected to the motion detection device can judge whether a player performed leg or arm motions based on detection results from the detecting unit of the motion detection device.

All examples and conditional language used herein are intended for explanatory purposes to aid the readers in understanding the invention and the concepts contributed by the inventor to furthering the art, and are not to be construed as limiting the scope of the invention to such specifically described examples and conditions, nor does the organization of such examples in the specification relate to a showing of the superiority and inferiority of the invention. Although the embodiment(s) of the present invention have been described in detail, it should be understood that various changes, substitutions, and alternations could be made hereto without

What is claimed is:

1. An exercise support system comprising:
a step touch pad input device; and
an exercise support device,
the step touch pad input device comprising:
    a detector configured to detect a motion of a player; and
    an output configured to output player motion information that is a detection result of the motion of the player to the exercise support device; and
the exercise support device comprising:
    an input interface configured to receive an input of the motion information of a plurality of players, each associated with any one of a plurality of groups;
    a memory configured to store instruction data with regard to motion instruction marks to be displayed on a screen and an appearance time and a movement path of the respective motion instruction marks; and
    a processor configured to:
        generate image data including a motion evaluation mark to be displayed on a screen;
        generate image data of a plurality of display patterns based on the instruction data stored in the memory, each having a series of motion instruction marks, each to be displayed in a scrolling manner on the screen, the plurality of display patterns including at least a first display pattern and a second display pattern, with the second display pattern being formed so as to have the motion instruction marks of the first display pattern and including additional motion instruction marks;
        evaluate a player's motion on the basis of a level of coincidence of the motion instruction mark and the motion evaluation mark at a time when motion information of the player corresponding to the motion instruction mark is input by the input interface,
        evaluate each of the plurality of groups on the basis of a sum of evaluation results of each player associated with each group, and
        generate image data of a result of each group in a comparable manner.

2. The exercise support system according to claim 1, wherein
the processor is further configured to associate, with a player, an index indicating a level of coincidence of the motion instruction mark and the motion evaluation mark for each of the motion instruction marks, and to generate image data of the index in a scrolling manner.

3. The exercise support system according to claim 1, wherein
the processor is further configured to evaluate a player's motions on the basis of a number of motions with a high level of coincidence of the motion instruction mark and the motion evaluation mark.

4. An exercise support system comprising:
a step touch pad input device; and
an exercise support device, the exercise support device comprising:
    an input interface configured to input motion information, as detected by the step touch pad input device, of a plurality of players, each associated with any one of a plurality of groups;
    a memory configured to store instruction data with regard to motion instruction marks to be displayed on a screen and an appearance time and a movement path of the respective motion instruction marks; and a processor configured to:
- generate image data including a motion evaluation mark to be displayed on a screen;
- generate image data of a plurality of display patterns based on the instruction data stored in the memory, each having a series of motion instruction marks, each to be displayed in a scrolling manner on the screen, the plurality of display patterns including at least a first display pattern and a second display pattern, with the second display pattern being formed so as to have the motion instruction marks of the first display pattern and including additional motion instruction marks;
- evaluate a player's motion on the basis of a level of coincidence of the motion instruction mark and the motion evaluation mark at a time when motion information of the player corresponding to the motion instruction mark is input by the input interface;
- evaluate each of the plurality of groups on the basis of a sum of evaluation results of each player associated with each group; and
- generate image data of a result of each group in a comparable manner to be displayed in a scrolling manner on the screen, the image data including history of indication of evaluation results with regard to the player's motion, the history of indication including indication of the latest evaluation result and indication of the past set times evaluation results with regard to the player's motion.

* * * * *